United States Patent Office 3,073,665
Patented Jan. 15, 1963

3,073,665
PROCESS FOR THE IMPROVEMENT AND PRESERVATION OF HIDES AND PRODUCT THEREFROM
Beverly E. Williams, La Grange Park, Ill., assignor to Hodges Research and Development Company, New York, N.Y., a corporation of California
No Drawing. Filed Apr. 28, 1960, Ser. No. 25,246
3 Claims. (Cl. 8—94.18)

This invention relates to the treatment of animal hides, and has particular reference to a process for the improvement and preservation of animal hides and the like, such as skins and pelts.

Animal hides, skins and pelts are conventionally preserved by a long period (in the neighborhood of 30 days) of contact with rock salt or by soaking in brine. This extended period of treatment is disadvantageous from the standpoint that it involves considerable labor expense and tie-up of inventory while subjecting the hides to considerable shrinkage. One of the principal objects of this invention is, therefore, to provide a novel process for preserving hides which eliminates the time-consuming salting treatment method and reduces shrinkage of the hides.

Another object of this invention is to provide a process for preserving hides by reducing bacteria, enzyme and organism spoilage prior to tanning in such a manner as to permit the production of improved tanned leather products therefrom.

A further object of this invention is to produce a plumper and tougher hide by a preservation process which is quick and inexpensive to carry out on a quantity production basis involving minimum shrinkage in the hide.

Other objects and advantages of this invention, it is believed, will be readily apparent from the following detailed description of preferred embodiments thereof.

Briefly, this invention comprehends within its scope a process wherein animal hides are preferably subjected to an antibiotic treatment preferably followed by a short-time soaking in brine. The antibiotic treatment may comprise intraperitoneal or other suitable site injection of the animal, a few hours prior to slaughter, with a solution of the antibiotic in an injectable menstruum such as physiological saline, the vascular system of the animal itself then insuring distribution of the antibiotic throughout the carcass. The same general effect can be achieved, although usually less economically, by pumping the preserving agent under pressure into the vascular system of the hide-on carcass, either immediately preceding or following killing. In these types of antibiotic treatments, the meat itself, as well as the hide, is preserved by the antibiotic. If preservation of the hide alone is desired, the antibiotic treatment can be carried out by immersion in a brine or aqueous solution of the antibiotic, by spraying with such a solution, or by sprinkling with a dry antibiotic-containing powder, or in general contacting the hide with the antibiotic by any means known in the art. Combinations of these treatments, i.e., both ante or post mortem injection of the animal and dipping into an antibiotic-containing solution, or other direct application to the hides, are within the scope of this invention.

Any antibiotic such as oxytetracycline, chlortetracycline, tetracycline, chloromycetin, streptomycin, penicillin, or others may be used.

Broad spectrum antibiotics like oxytetracycline are preferred for the injection treatment where used, because they are effective against many Gram-positive and Gram-negative bacteria, both aerobic and anaerobic, such as Salmonella, Micrococci and Clostridia. Oxytetracycline is fairly stable at low and room temperatures, but decomposes with relative ease at temperatures used in cooking.

The antibiotics may be used in any of their known, antibacterially active forms, such as the base or acid per se, or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts. Penicillin is preferably employed as one of its metal or organic base salts. Streptomycin or its chloride salts; or its derivative, dihydrostreptomycin and its salts; may be utilized. Generally the amount of antibiotic required in relation to the weight of the animal or hide treated is very small. For instance, by the intraperitoneal injection method or injection at the base of the ear or base of the tail, from 1–10 mg. of oxytetracycline per pound is sufficient, while normally 2–5 mg. per pound is preferred. Similar proportions are utilized in the spraying, dipping and other techniques.

The tetracyclines are closely congeneric derivatives of the polycyclic naphthacene-carboxamide. The sensitivity or resistance of a particular microorganism to the three congeners is quite similar. Their structural formulas are as follows:

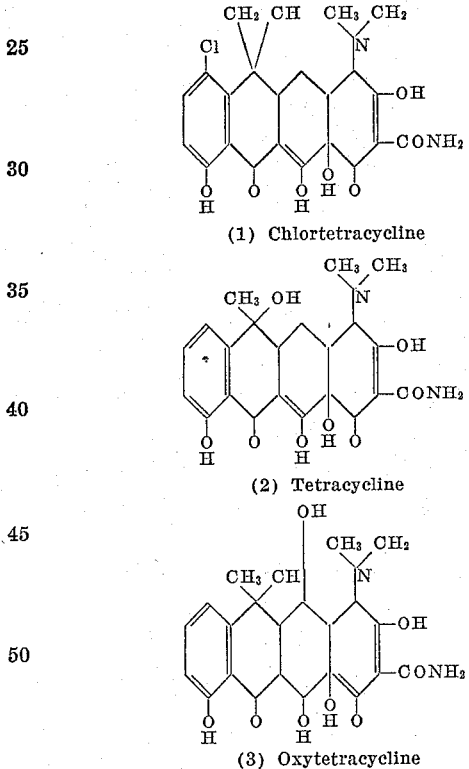

(1) Chlortetracycline (2) Tetracycline (3) Oxytetracycline

The crystalline bases are faintly yellow, odorless, slightly bitter compounds. They are only slightly soluble in water at pH 7 (0.25 to 0.5 mgm. per milliliter), but they form soluble sodium salts and hydrochlorides. Instability of solutions of all the tetracyclines increases with pH and temperature. At the temperatures used in cooking, these antibiotics will decompose with relative ease. The bases and the hydrochlorides are stable indefinitely as dry powders. The antibiotics may be used in any of their known, antibacterially active forms, such as the base or acid per se, or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts.

For the practice of the method of this invention, the most suitable antibiotic will be employed. The concentration to be used will vary widely, depending in part on the selected antibiotic, and in part on how the solution is applied. For oxytetracycline, which is the preferred antibiotic in the practice of the method of this invention, a concentration ranging from about 100 to about 1,000 parts per million may be used. A concentration of 500 parts per million of oxytetracycline has been found particularly suitable for the practice of this invention.

The solubility of oxtetracycline will generally be enhanced by converting it to a salt thereof such as the hydrochloride. It may, if desired, be combined with other chemical compounds which have a favorable effect on its solubility. Thus, for example, a preparation containing oxytetracycline in combination with citric acid may be used. The citric acid has a favorable effect in solubilizing the oxytetracycline and protects it by chelating some of the metal ions such as calcium which may be present in the water supply.

Since antibiotics are not necessarily pure chemical compounds, but may be the product of living microorganisms, their effectiveness sometimes varies depending on the source of the material. Accordingly antibiotics are frequently identified by reference to their potency. The oxytetracycline hydrochloride referred to above is designated as having a potency of approximately 795 mcg./g. It is a product of his potentcy which is referred to above in designating the concentration ranges and preferred concentration of oxytetracycline which may be used in the practice of this invention. Where products are used which have a different potency or which comprise the antibiotic in combination with another material such as brine, sodium hypochlorite, citric acid or the like, the concentration of the product used will be adjusted accordingly to obtain an appropriate concentration equivalent to from about 100 to about 1,000 p.p.m., and preferably about 500 parts per million of oxytetracycline hydrochloride having a potency of approximately 795 mcg./g.

In general, antibiotics of the tetracycline type, while they are highly active against a wide spectrum of bacteria, are not particularly effective in the control of the growth of fungi. Fungi or molds, while capable of growing on the surface of meat, do not present as acute a problem in hide treatment as do the bacteria such as the odor-forming and putrefactive bacteria. Nevertheless, difficulties with the growth of these microorganisms may be encountered. Some of the newer antibiotics are themselves antifungal, such as tennecetin and nystatin, and suitable antifungal antibiotics may be used if desired in practicing the method of this invention, in conjunction with a wide-spectrum anti-bacterial antibiotic. Alternatively, where it is desired to incorporate a fungicide or fungistat into the aqueous or brine solution of an antibiotic such as the tetracycline-type antibiotics, antifungal compounds which are not antibiotics may be used. Preferred compounds for use in this connection comprise sorbic acid and salts of sorbic acid, particularly readily water-soluble salts such as sodium or potassium sorbate, and especially potassium sorbate. In general, effective control of fungi and molds may be produced using relatively low concentrations such as from about 500 parts per million to about 1.0% of potassium sorbate in the aqueous solution. A concentration of 0.1% by weight of potassium sorbate has been found to give satisfactory results.

Following the antibiotic treatment, the hides may be placed in a brine solution, which may or may not contain an antibiotic, for a few hours up to 48 hours in order to further preserve the product, moisten it enough to avoid brittleness and to add back reasonable weight. The brine bath may be heated to not over 118° F., just under cooking temperatures. For convenience in shipping and handling, the brine treatment could be carried out after shipment of the hides to the tannery but before tanning.

As noted above, it may be desirable to incorporate a moldicide such as sorbic acid in the brine bath to inhibit the growth of molds on the product. About 2 pounds of sorbic acid per 100 gallons of brine water is usually sufficient. Moreover, the brine bath could contain other additives such as a suitable bacteriacide and/or a suitable antioxidant.

The following specific examples are illustrative of the process of this invention, but the invention is not to be limited thereto:

Example 1

Beef cattle to be inoculated were passed in single file through a station wherein barriers were dropped in front of and behind them momentarily to prevent further movement. A veterinarian (although other trained personnel may perform the operation) injected each cattle in its right intraperitoneal cavity with oxytetracycline at a dose rate of 2 mg. per pound of live weight of the cattle. A 1000 pound steer thus received a shot of 2 gm. at a cost of about 80¢. The dosage formulation consisted of 1 gram of oxytetracycline as the hydrochloride in 50 ml. of sterile distilled water. The cattle were killed ½ to 4 hours after injection, the tissue level of the antibiotic being at its highest at from 1 to 4 hours after injection. Following slaughter, the carcasses were skinned in the conventional manner.

The hides were then treated by dipping in a saturated brine solution, heated to about 118° F., for about 24 hours to provide the finished, sterilized, preserved, plumped and toughtened hides. The temperature of the brine solution should be under 120° F., the temperature above which hair slippage would commence.

Example 2

The process of this example was the same as Example 1, except that the injection of the antibiotic was dispensed with and in place thereof 500 parts per million of terramycin was added to the brine solution.

Example 3

A number 2 cattle hide was divided into three parts from the back or best portion of the hide and the three parts were adjacent to each other and identical in quality.

One sample piece was wrapped and refrigerated; the second sample piece was placed in satuarted brine water maintained at 118° F.; and the third sample piece was placed in saturated brine water maintained at 118° F. and containing the above described amount of terramycin. At the end of 24 hours the two hide samples were removed from the brine water solutions and compared with the control sample from refrigeration for plumpness and hair slippage. Both samples from the heated brine water solutions were almost twice as thick as the control sample from refrigeration. Slight hair slippage was noted on the sample from the saturated brine water without antibiotic. On this sample it was possible to scuff or slough-off some of the top surface at the hair roots and on the flesh side of this sample some softness and deterioration was noted. It follows that treatment of the hide in saturated brine water at 118° F. although plumping the hide deteriorated the surface of the hide.

The sample of the hide taken from the saturated brine water including the antibiotic exhibited no hair slippage and no decomposition or deterioration. There was no looseness of the surface of either side of this sample and the surface could not be sloughed off.

Thereafter the three samples were refrigerated to 40° F. and when the samples had reached this temperature they were treated for toughness by tearing. The samples treated in the heated brine solutions, after cooling, were considerably tougher than the control sample and, even though chilled, the samples treated in the heated brine solutions remained plump and on the order of twice the thickness of the control sample.

Having fully described my invention, it is to be understood that I do not wish to be limited to the details set forth, but my invention is of the full scope of the appended claims.

I claim:
1. A process for treating, plumping and toughening animal hides and the like before tanning which comprises applying a broad spectrum antibiotic inside the hides, to kill bacteria and other living organisms, and soaking said hides in brine at about 118° F. to arrest enzymatic action therein.

2. A process for treating animal hides and the like before tanning which includes the step of soaking said hides in heated brine at about 118° F. containing about 500 parts per million of a broad spectrum antibiotic, thereby plumping, toughening and retarding spoilage.

3. A product produced by the process of claim 1.

References Cited in the file of this patent
UNITED STATES PATENTS

| | | |
|---|---|---|
| 2,113,799 | Muller | Apr. 12, 1938 |
| 2,786,768 | Deatherage | Mar. 26, 1957 |
| 2,805,975 | Hamilton | Sept. 10, 1957 |

OTHER REFERENCES

Chambard: J.S.L.T.C. 38; April 4, 1954, p. 134.
Fulton et al.: J.A.L.C.A., February 1945, pp. 88, 89.
Progress in Leather Science, 1920–1945, London, 1948, pp. 108–110.